United States Patent
Kadoto et al.

(10) Patent No.: US 9,438,907 B2
(45) Date of Patent: Sep. 6, 2016

(54) MOTION PICTURE ENCODING APPARATUS

(75) Inventors: Tadakazu Kadoto, Tokyo (JP); Masashi Takahashi, Tokyo (JP); Nobuhiro Chihara, Tokyo (JP)

(73) Assignee: HITACHI KOKUSAI ELECTRIC, INC., Tokyo (JP)

( * ) Notice: Subject to any disclaimer, the term of this patent is extended or adjusted under 35 U.S.C. 154(b) by 473 days.

(21) Appl. No.: 13/983,021

(22) PCT Filed: Nov. 22, 2011

(86) PCT No.: PCT/JP2011/076878
§ 371 (c)(1),
(2), (4) Date: Jul. 31, 2013

(87) PCT Pub. No.: WO2012/111208
PCT Pub. Date: Aug. 23, 2012

(65) Prior Publication Data
US 2013/0308702 A1 Nov. 21, 2013

(30) Foreign Application Priority Data

Feb. 17, 2011 (JP) .................................. 2011-032057

(51) Int. Cl.
*H04N 19/176* (2014.01)
*H04N 19/50* (2014.01)
(Continued)

(52) U.S. Cl.
CPC ........ *H04N 19/00569* (2013.01); *H04N 19/11* (2014.11); *H04N 19/136* (2014.11); *H04N 19/176* (2014.11); *H04N 19/61* (2014.11)

(58) Field of Classification Search
CPC .................................................. H04N 19/103
See application file for complete search history.

(56) References Cited

U.S. PATENT DOCUMENTS

| 7,688,893 B2 | 3/2010 | Morimoto et al. |
| 8,189,667 B2 | 5/2012 | Kawashima et al. |

(Continued)

FOREIGN PATENT DOCUMENTS

| JP | 2006-270437 A | 10/2006 |
| JP | 2006-304102 A | 11/2006 |

(Continued)

OTHER PUBLICATIONS

Tu-Chin Wang et al.: "Performance Analysis of Hardware Oriented Algorithm Modifications in H.264," IEEE International Conference on Acoustics, Speech, and Signal Processing (ICASSP 2003), Apr. 2003, vol. 2, pp. 493-496.

(Continued)

*Primary Examiner* — Sath V Perungavoor
*Assistant Examiner* — Clifford Hilaire
(74) *Attorney, Agent, or Firm* — Brundidge & Stanger, P.C.

(57) ABSTRACT

Suppression of prediction error accumulating in an intra prediction is described. A motion picture encoding apparatus that performs encoding processing for each pixel block using a motion picture encoding method includes intra prediction processing for generating a prediction image using correlation of pixels therearound, and in the intra prediction processing, the motion picture encoding apparatus has processing for generating a quasi-prediction image from an input image, wherein when a prediction mode is determined, a weight is given to a pixel serving as a reference pixel in the intra prediction processing, and thus, the prediction mode is determined. When the weight is set at one or more, an error of a pixel serving as a reference pixel in a subsequent block is emphasized, and therefore, a prediction mode that is likely to propagate the error to the subsequent block is less likely to be selected.

1 Claim, 12 Drawing Sheets

(51) Int. Cl.
*H04N 19/11* (2014.01)
*H04N 19/136* (2014.01)
*H04N 19/61* (2014.01)

(56) References Cited

U.S. PATENT DOCUMENTS

| | | | |
|---|---|---|---|
| 8,315,467 B2 | 11/2012 | Nakamura et al. | |
| 2007/0019726 A1* | 1/2007 | Cha | H04N 19/176 375/240.12 |
| 2009/0060039 A1 | 3/2009 | Tanaka et al. | |
| 2010/0150237 A1* | 6/2010 | Parhy | H04N 19/176 375/240.13 |
| 2010/0278266 A1* | 11/2010 | Daian | H04N 19/176 375/240.15 |

FOREIGN PATENT DOCUMENTS

| | | |
|---|---|---|
| JP | 2008-048065 A | 2/2008 |
| JP | 2008-252346 A | 10/2008 |
| JP | 2008-283303 A | 11/2008 |
| JP | 2009-081830 A | 4/2009 |
| JP | 2009-290498 A | 12/2009 |
| WO | WO 2011019384 A1 * | 2/2011 |

OTHER PUBLICATIONS

International Search Report issued in corresponding application No. PCT/JP2011/076878 on Dec. 20, 2011.

* cited by examiner

: REFERENCE PIXEL (400)

: PREDICTION TARGET PIXEL (401)

MOTION PICTURE ENCODING APPARATUS

TECHNICAL FIELD

The present invention relates to a motion picture encoding apparatus, and more particularly to a motion picture encoding apparatus that makes selection of an intra prediction and an inter prediction at an encoding side.

BACKGROUND

H.264/AVC (hereinafter referred to as H.264) is known as the latest standard of highly efficient motion picture compression technique. H.264 is an international standard of motion picture encoding developed by JVT that is jointly established in December, 2001, by a video encoding expert group (VCEG) of ITU-T and a motion picture encoding expert group (MPEG) of ISO/IEC. ITU-T has given approval to H.264 as a standard in May, 2003. ISO/IEC JTC has standardized H.264 as MPEG-4 Part 10 Advanced Video Coding (AVC) in 2003. In addition, expanding work of the color space and the pixel gradation has been done, and thereupon the draft of final standard has been generated in July, 2004, as Fidelity Range Extension (FRExt).

The main features of H.264 are as follows.
- As compared with the conventional MPEG-2 and MPEG-4 methods, H.264 achieves almost the same quality of image with the encoding efficiency almost twice as high as the conventional MPEG-2 and MPEG-4 methods.
- Compression algorithm: H.264 employs inter-picture prediction, quantization, entropy coding
- H.264 can be widely used for any application ranging from a low bit rate, e.g., a cellular phone, to a high bit rate, e.g., an HD television.

As described above, various kinds of discussions have been made about motion picture encoding techniques, and currently, standardization work of H.265 is now being done as a next-generation standard.

Hereinafter, the technical contents of H.264 will be explained.

Figure 1:
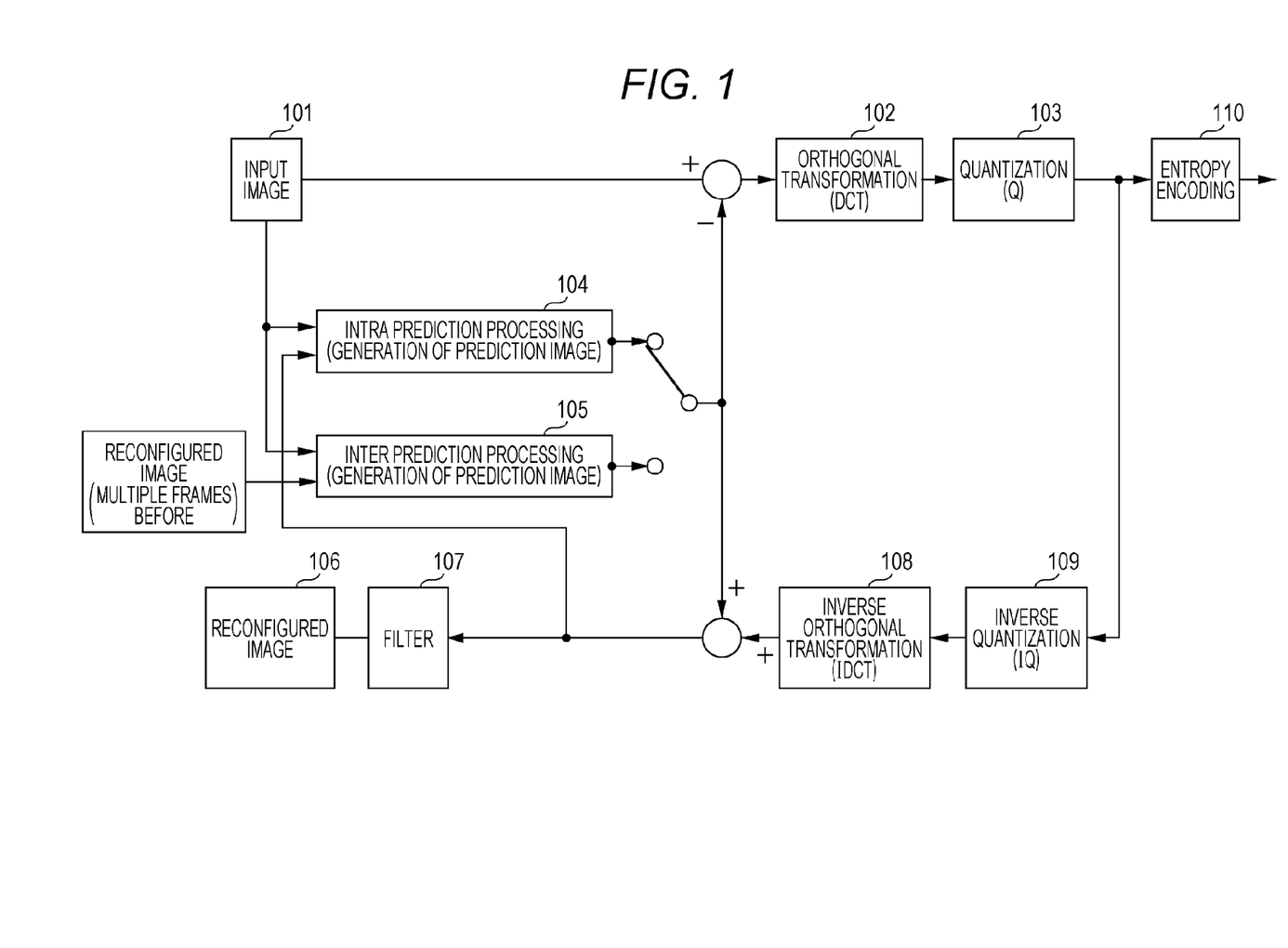
FIG. 1 is a general configuration diagram illustrating an encoder 1 performing encoding using H.264 (conventional technique).

FIG. 1 is a general configuration diagram illustrating an encoder 1 that performs encoding using H.264. In H.264, an intra prediction (104) for generating a prediction image within a screen and an inter prediction (105) for generating a prediction image from multiple screens are defined. Any one of the intra prediction and the inter prediction is selected based on predetermined criteria, a difference between the selected prediction image and an input image (101) is obtained, subsequent orthogonal transformation (102) and quantization (103) processing is done on the difference data, and encoding processing is performed on the quantized data (110).

It should be noted that the reconfigured image (106) used as a reference image in the inter prediction processing (105) is generated by applying inverse-quantization (109) and inverse-orthogonal transformation (108) processing, which are processing opposite to the orthogonal transformation and quantization processing, on the quantized data (103) (or entropy encoded data (110)) and thereafter applying deblocking filter processing (107) for alleviating block noise on the data added with the prediction image. In some cases, the deblocking filter may not be used. In H.264, only the difference image is encoded and transmitted, whereby high encoding efficiency is achieved.

Inter prediction processing and intra prediction processing performed by the encoder 1 as prediction processing will be hereinafter explained.

Figure 2:
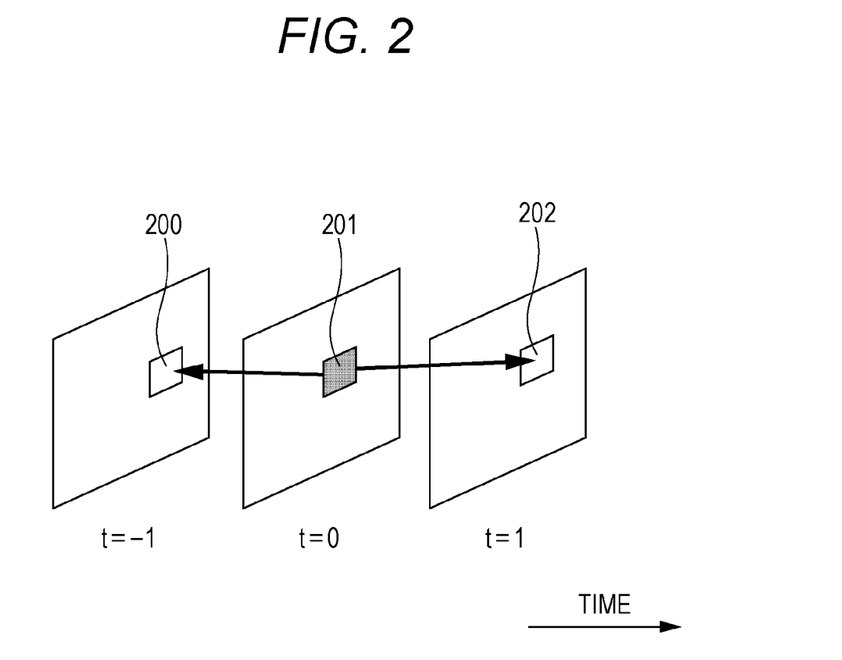
FIG. 2 is a figure for explaining inter prediction (conventional technique).

FIG. 2 is a figure for explaining the inter prediction. As illustrated in FIG. 2, the inter prediction for generating a prediction image from multiple screens is processing for generating the prediction image by calculating, with regard to a prediction target block (201) of an input image of a prediction target, a motion vector of the prediction target block from reference blocks (200/202) of pictures before and after the picture in question (time t=−1, t=1).

Figure 3:
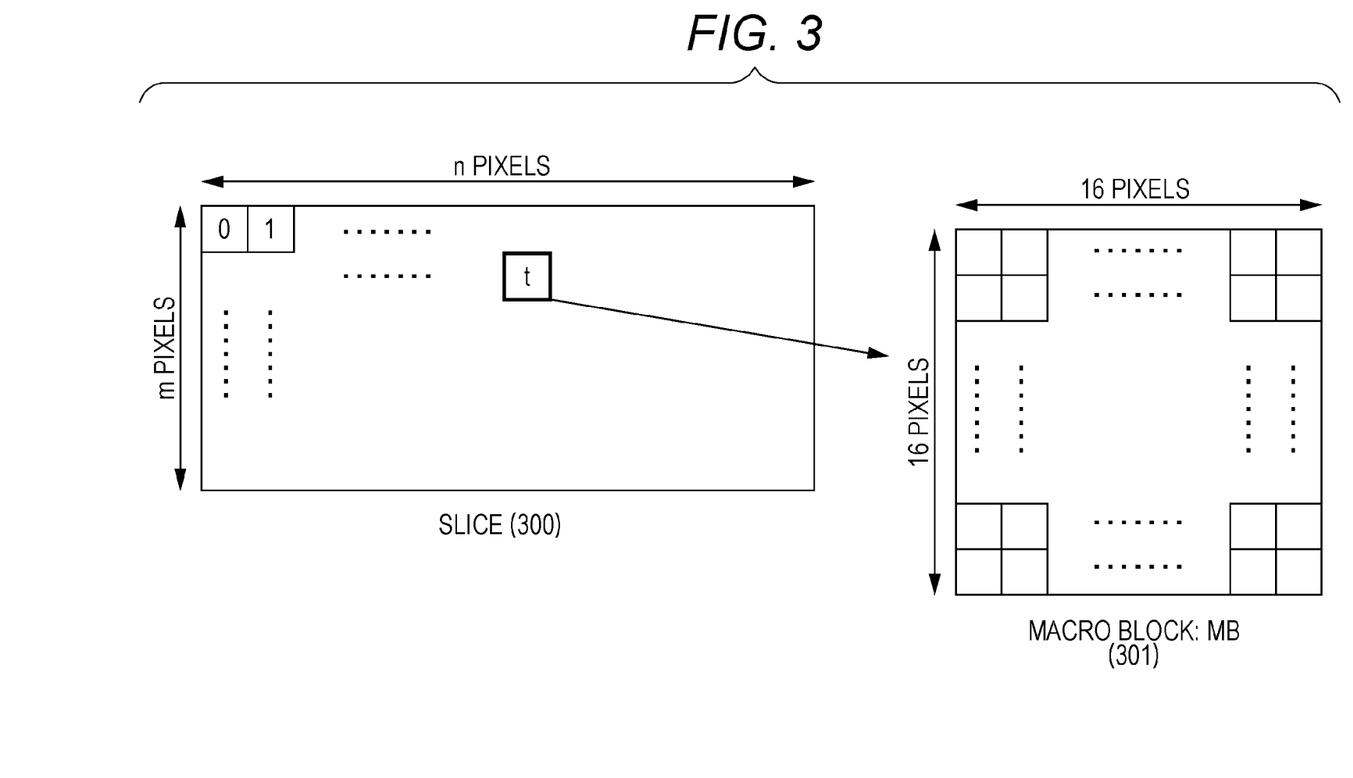
FIG. 3 is a figure for explaining intra prediction (conventional technique).

FIG. 3 is a figure for explaining the intra prediction. The intra prediction is a method for generating a prediction image using correlation between pixels in proximity. In the intra prediction processing of H.264, a screen is divided into processing blocks called slices (300) having m by n pixels, and further, a slice is divided into macro blocks (301) having 16 by 16 pixels. In the intra prediction processing, this macro block 301 is adopted as a basic processing unit, and further, a prediction image is generated for every 4 by 4, 8 by 8, and 16 by 16 pixel block of the macro blocks 301.

Figure 4:
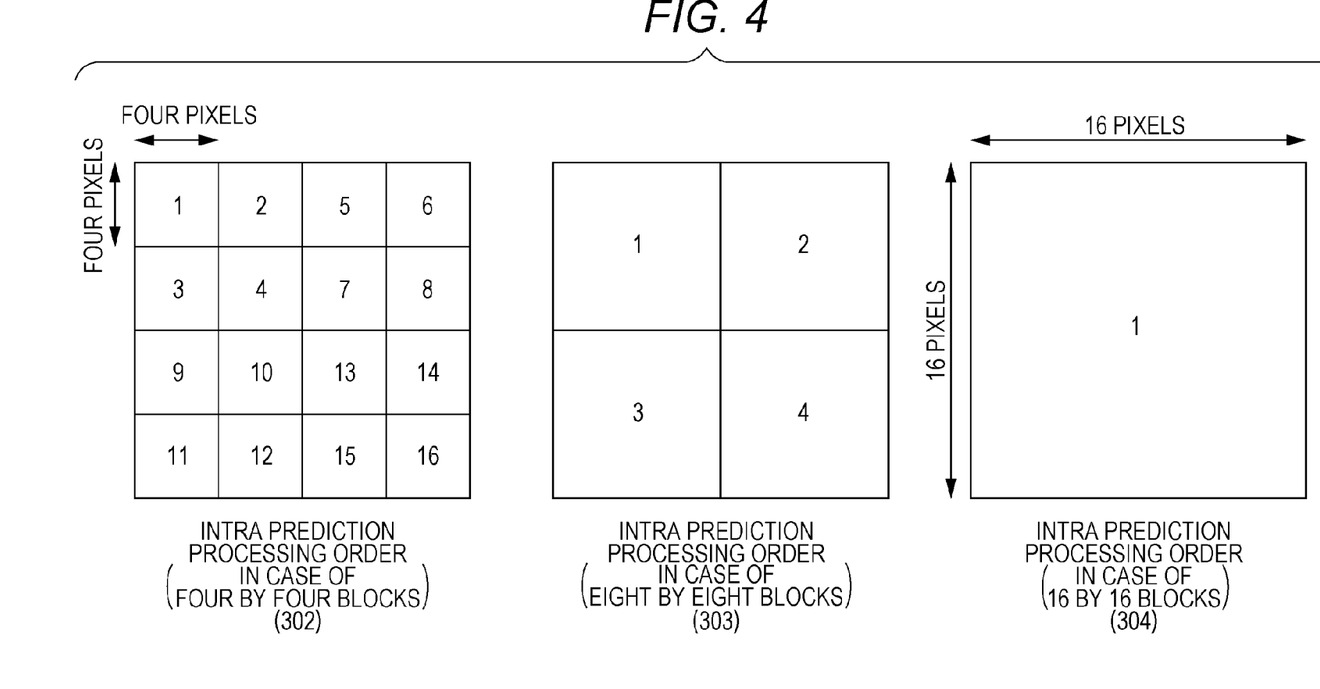
FIG. 4 is the order of processing of pixel blocks in the intra prediction (conventional technique).

FIG. 4 illustrates the order of processing of the pixel blocks in each of cases of 4 by 4, 8 by 8, and 16 by 16. More specifically, the processing is performed in ascending order of the number indicated within each pixel block.

In the intra prediction processing, a prediction image is generated by referring to pixels at the left, the upper left, the top, or the upper right of the prediction target block. This is because, in order to let the decoding side to generate the prediction image in the same manner, an encoded pixel (i.e., for the decoding side, this is a pixel that has been decoded and image-reconfigured) is required to be adopted as a reference pixel. For example, FIG. 5 shows reference pixels used to generate a prediction image of the intra prediction in units of 4 by 4 pixel units.

Figure 5:
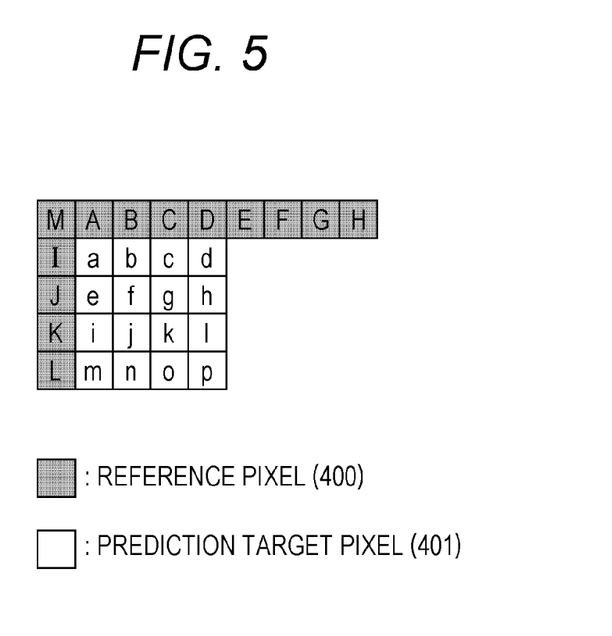
FIG. 5 is a figure illustrating a relationship between reference pixels and prediction target pixels in the intra prediction of 4 by 4 pixel block (conventional technique).

For sixteen prediction target pixels 401 (a to p) included in the prediction target block of FIG. 5, symbols A to M denote reference pixels 400 used for the prediction. In the H.264/AVC, the prediction image can be generated in 4 by 4 pixel block unit (hereinafter referred to as 4 by 4 block), 8 by 8 pixel block unit (hereinafter referred to as 8 by 8 block), and 16 by 16 pixel block unit (hereinafter referred to as 16 by 16 block). At this occasion, a processing method defining processing for generating a prediction target block from reference pixels is called a mode. Available modes for each of the 4 by 4 block and the 8 by 8 block include nine modes, and available modes for the 16 by 16 block include four modes. That is, 22 modes are available in total.

Figure 6:
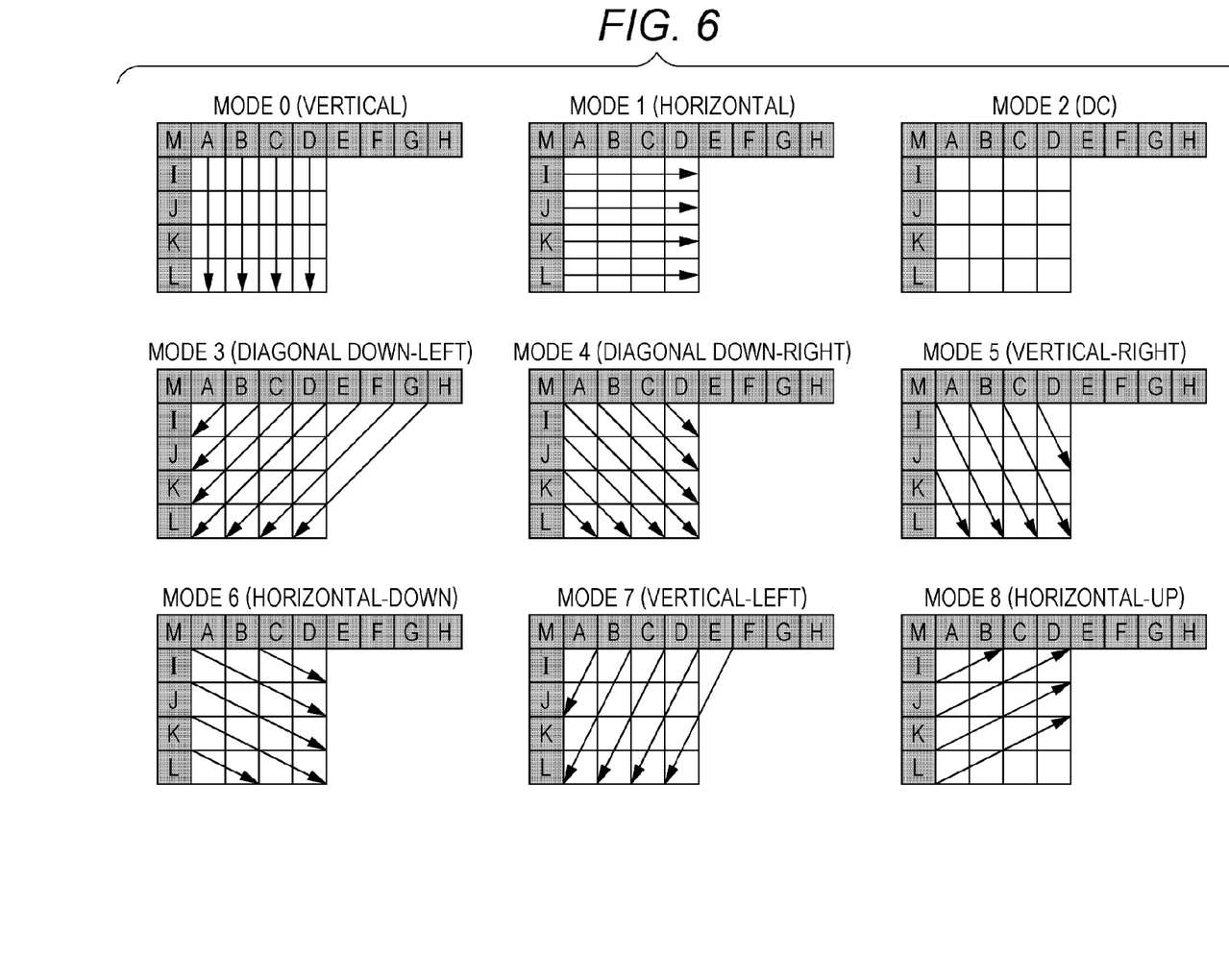
FIG. 6 is a figure illustrating (nine types of) prediction modes that can be used for the intra prediction of 4 by 4 block (conventional technique).

FIG. 6 illustrates, for example, nine modes that can be used for the 4 by 4 block.

As described above, H.264, which is the latest motion picture encoding standard, makes use of various kinds of methods in order to achieve a compression technique with a high degree of efficiency.

Figure 7:
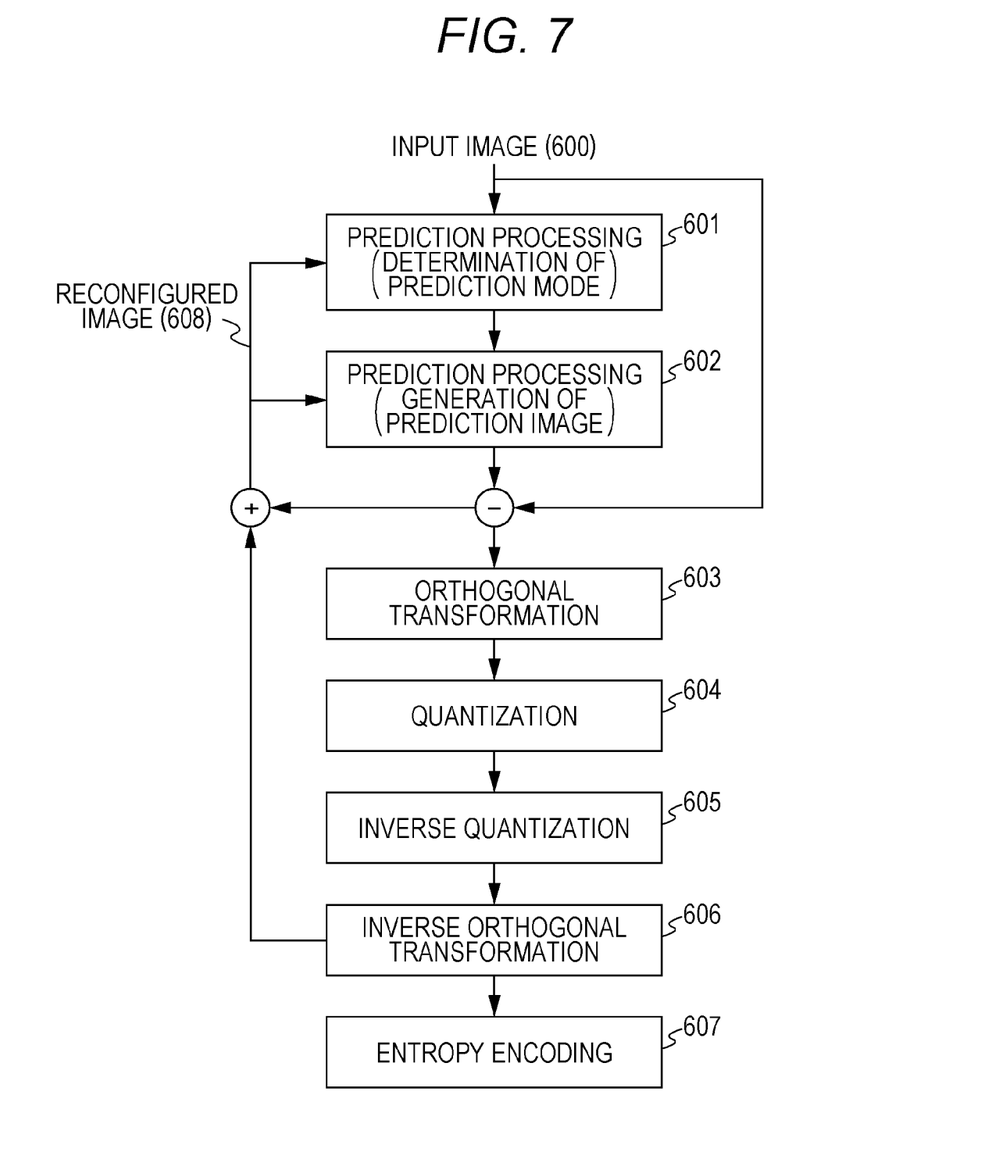
FIG. 7 is a flowchart illustrating encoding processing performed by the encoder 1 (conventional technique).

FIG. 7 is a flowchart illustrating encoding processing that is performed by the encoder 1. In this case, a case where the intra prediction processing is used as the prediction processing will be hereinafter explained. In the encoding processing, when an input image is received, a prediction image of a prediction target block is generated from a reconfigured image for all the prediction modes, and differences from the input image are calculated, and then a mode of which sum of absolute differences (hereinafter referred to as SAD) is the least is determined as an optimum prediction mode for the intra prediction (601). The SAD is, for example, defined by the following expression. It should be noted that Σi means that all the pixels within the prediction target block are adopted as target.

[Math 1]

$$SAD = \sum_i |Intput(i) - Pred(i)|, \quad \text{expression 1}$$

... Input($i$): input pixel, Pred($i$): prediction pixel.

The SAD is generally used as an evaluation standard, but it may also be possible to use evaluation values other than the above. The method for determining a prediction mode is not explicitly described in the standard, and the method for determining a prediction mode depends on the design.

Subsequently, a prediction image is generated from a reconfigured image (608) with the prediction mode thus determined (602), and a difference image from the input image is obtained. Thereafter, the reconfigured image (608) is obtained through an orthogonal transformation (603), a quantization (604), an inverse-quantization (605), and an inverse-orthogonal transformation (606). Thereafter, using methods such as context-adaptive variable-length coding (CAVLC)/context-based adaptive binary arithmetic coding (CABAC), entropy encoding is performed (607), and a stream is generated. At this occasion, various kinds of processing are required to obtain the reconfigured image (608), and it takes some processing time.

In order to simply increase the speed of the encoding processing, generally used is a method of parallel processing with two or more pipeline configuration in parallel where processing from the determination of the prediction mode (601) to the encoding processing (607) is made into MB units. However, when parallel processing is carried out, when a prediction image is generated from a reconfigured image as described above and a mode of the least prediction error (evaluation value) is determined in the determination (601) of the prediction mode of the intra prediction processing, it takes some processing time to obtain the reconfigured image, which makes it impossible to increase the speed.

A method suggested as means for reducing the time to obtain a reconfigured image (reference image) includes a method for determining a prediction mode by generating a quasi prediction image using an input image instead of generating a prediction image using a reconfigured image when determining a prediction mode (601) (for example, see Patent Document 1).

In normal circumstances, there occurs not a little difference, due to quantization error, between a prediction image generated from an input image and a prediction image generated from a reconfigured image. Therefore, the prediction may not necessarily be determined in an optimum manner. Therefore, in particular, with a low bit rate, prediction error is accumulated due to failure to determine a mode, which significantly reduces the quality of the image.

With the image encoding apparatus of Patent Document 1, quasi-intra prediction is done using an original image, and thereafter, Hadamard transform, quantization, and inverse calculation thereof are applied to the prediction error, and the image encoding apparatus of Patent Document 1 uses a mode selection method for alleviating error propagation by checking the degree of degradation due to the quantization.

CITATION LIST

Patent Documents

Patent Document 1: Japanese Patent Application Laid-Open No. 2009-290498
Patent Document 2: Japanese Patent Application Laid-Open No. 2006-270437
Patent Document 3: Japanese Patent Application Laid-Open No. 2008-048065
Patent Document 4: Japanese Patent Application Laid-Open No. 2009-081830

SUMMARY OF THE INVENTION

Problems to be Solved by the Invention

There is a problem in that an image encoding apparatus of Patent Document 1 has a high amount of processing in Hadamard transform and the like for prediction error.

It is an object of the present invention to provide a motion picture encoding apparatus which selects a mode for alleviating error propagation with processing that can be made into a pipeline with a low amount of processing, thus capable of preventing significant reduction of image quality even for the purpose that requires high speed processing.

Solutions to Problems

A motion picture encoding apparatus according to the present invention is a motion picture encoding apparatus that encodes a pixel block upon selecting one of a plurality of intra prediction modes, and the motion picture encoding apparatus includes a quasi-prediction image generating unit that generates a plurality of quasi-prediction images according to the plurality of intra prediction modes from an input image, and a prediction mode determining unit that calculates prediction errors of the plurality of prediction images generated by the quasi-prediction image generating unit by giving a weight of a pixel serving as a reference pixel in an intra prediction of another pixel block and determines a prediction mode on the basis of the plurality of prediction errors thus calculated.

In the motion picture encoding apparatus, the quasi-prediction image generating unit generates the prediction image using, as the reference pixel, a pixel obtained without being affected by quantization error from the input image, and the prediction mode determining unit calculates the prediction error by giving the pixel serving as the reference pixel a larger weight than a pixel other than the pixel serving as the reference pixel, and determines that a prediction mode corresponding to a smallest prediction error of the plurality of calculated prediction errors is an optimal prediction mode in the intra prediction.

In the motion picture encoding apparatus, the pixel block is obtained by dividing the input image in a predetermined order. The pixel obtained without being affected by quantization error is a pixel that is obtained directly from the input image or a pixel that is obtained directly from the prediction image generated by the quasi-prediction image generating unit. The pixel serving as the reference pixel is a pixel referenced in the intra prediction of a subsequent pixel block in the order, wherein the pixel serving as the reference pixel is a pixel at a lowest side or a rightmost side in the pixel block to be encoded. The prediction mode determining unit changes the weight in accordance with a quantization parameter or size of the pixel block to be encoded.

A motion picture encoding method according to the present invention is a motion picture encoding method that encodes a pixel block upon selecting one of a plurality of intra prediction modes, and the motion picture encoding method includes a step of generating a plurality of quasi-prediction images according to the plurality of intra prediction modes from an input image, a step of calculating prediction errors of the plurality of prediction images generated by the quasi-prediction image generating unit by giving a weight of a pixel serving as a reference pixel in an intra prediction of another pixel block and determining a prediction mode on the basis of the plurality of prediction errors thus calculated, a step of generating a prediction image from a reconfigured image in accordance with the determined prediction mode, a step of obtaining a difference image by subtracting the prediction image generated by the reconfigured image from the input image, a step of obtaining a coefficient by performing orthogonal transformation of the difference image and quantizing the coefficient, and a step of performing dequantization and inverse orthogonal transformation of the quantized coefficient and updating the reconfigured image on the basis of an image obtained by adding the coefficient to the prediction image generated from the reconfigured image.

Effects of the Invention

According to the present invention, error propagation of intra prediction can be alleviated.

DETAILED DESCRIPTION

First, propagation of prediction error which the present invention is aimed at will be explained.

Figure 8:
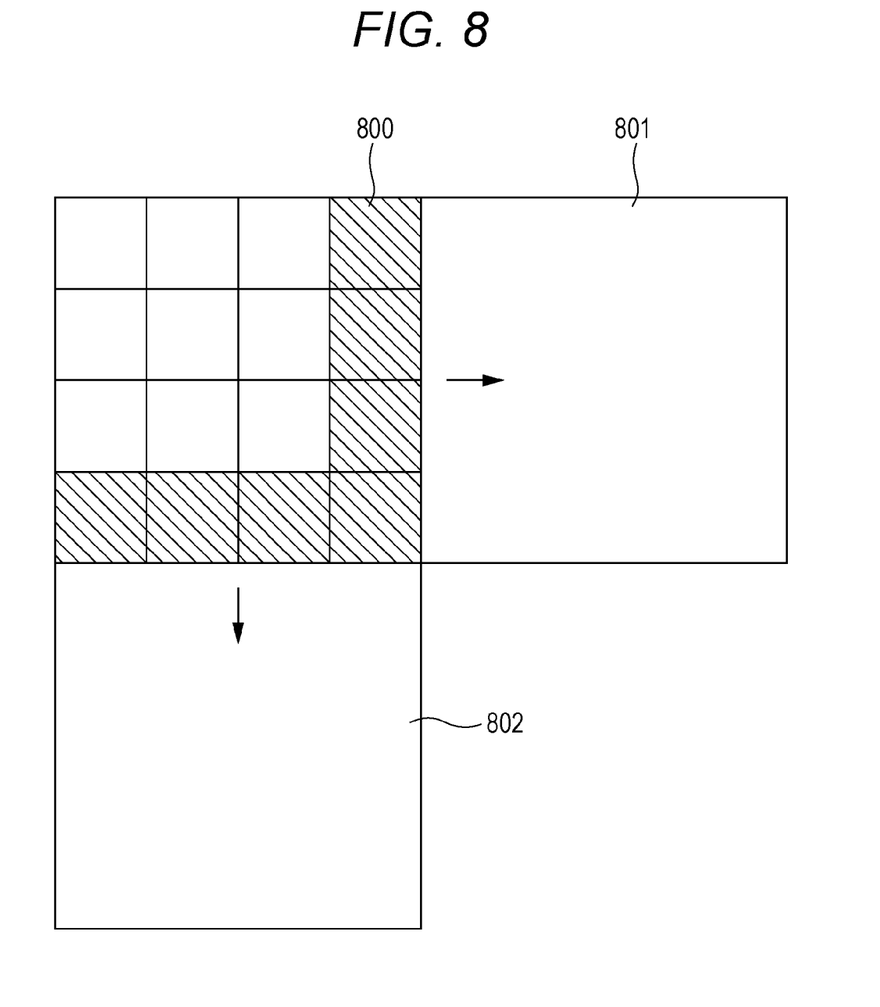
FIG. 8 is a figure illustrating propagation of the prediction error in the intra prediction.

FIG. 8 is a figure illustrating propagation of the prediction error in the intra prediction. In the prediction target block 801 or 802, prediction images are generated from reference pixels 800 adjacent thereto. If the error of the reference pixels 800 (prediction error) is high, the prediction error of the prediction target blocks (801/802) predicted therefrom also becomes high. More specifically, the prediction error of the reference pixels propagate to the adjacent blocks. Further, when blocks adjacent subsequently to them further refer to the values, the distribution of the prediction error is further enlarged.

Originally, the intra prediction of H.264 has a nature that the prediction error gradually increases along with progress of the encoding even if the best prediction mode is continuously selected. Further, when the quasi-prediction image is used, incorrect prediction mode selection accelerates the increase of the prediction error, and therefore, this results in reduction of the image quality as a result.

In an embodiment of the present invention, when the prediction error is evaluated, a higher weight is given to a pixel that would be a reference pixel in a subsequent block, so that this suppresses propagation of prediction error, and improves the accuracy of evaluation in the determination of the prediction mode. More specifically, it is difficult to reduce the prediction error that has once increased (it is difficult to make correct prediction from reference pixels involving errors), and therefore, instead of simply selecting a mode of which prediction error is the minimum in the current block, emphasis is placed on suppression of the speed of increase of the prediction error in view of prediction error of subsequent blocks.

Figure 9:
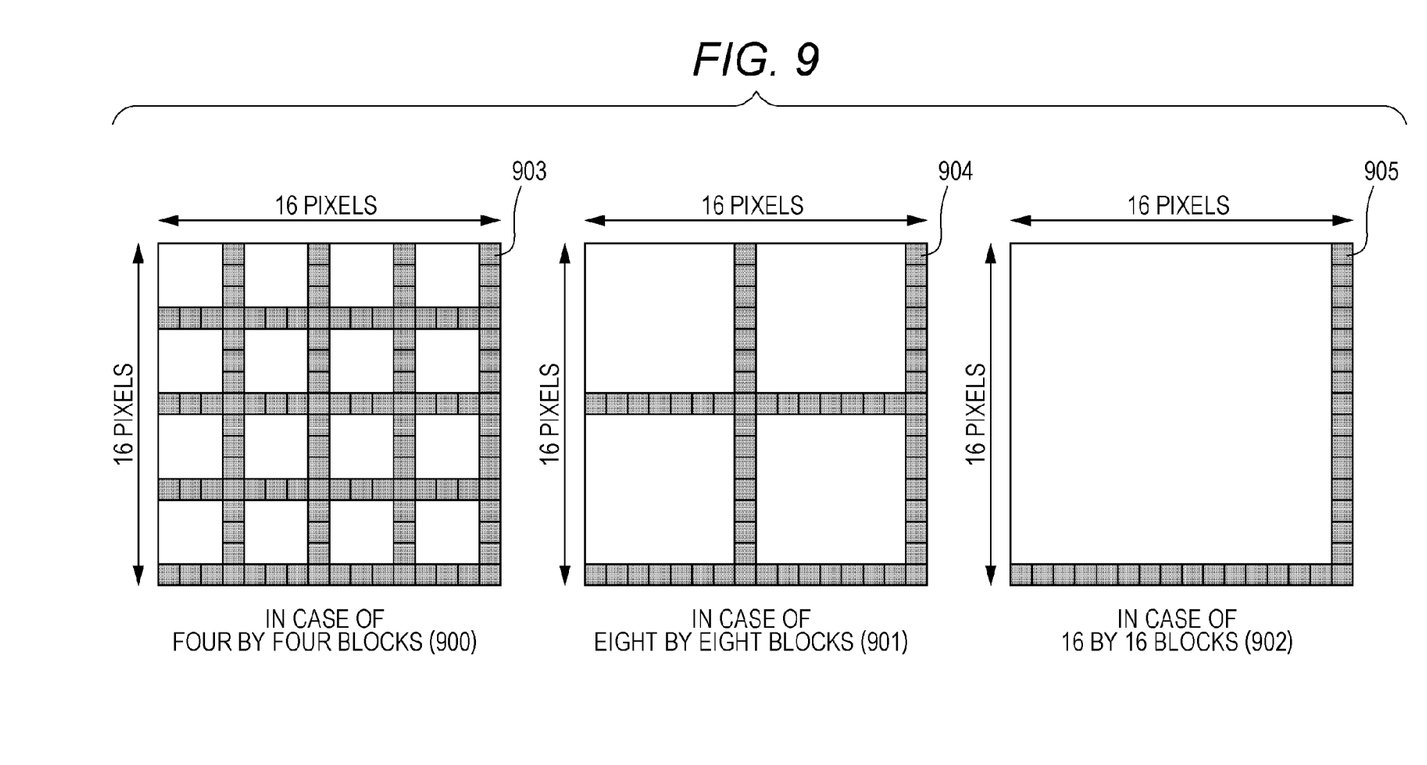
FIG. 9 is a figure illustrating an example of arrangement of pixels for giving weights (weighting target pixels).

FIG. 9 is a figure illustrating an example of pixels which are weighted, and filled portions (pixels at the lowermost side and the rightmost side in a block) are weighting target pixels. In a case of 4 by 4 block, 112 weighting target pixels (903) are defined, in a case of 8 by 8 block, 60 weighting target pixels (904) are defined, and in a case of 16 by 16 pixels, 31 weighting target pixels (905) are defined. Then, during calculation of SAD which is an evaluation value for determining a prediction mode as described above, a certain weight is given to an error of a weighting target pixel.

A calculation expression where weighting according to this example is applied to SAD will be shown below as SAD'. In this case, δ denotes weight coefficient (which is one or more in normal circumstances), and is a value that can be set at any value for each prediction mode.

[Math 2]

$$SAD' = \sum_i |\text{Input}(i) - \text{Pred}(i)| + \delta \sum_j |\text{Input}(j) - \text{Pred}(j)|, \quad \text{expression 2}$$

... Input(i) and Input(j): input pixel,
Pred(i) and Pred(j): prediction pixel,
... i: pixel other than weighting target pixel,
j: weighting target pixel, ... δ: weighting coefficient( ≥ 1).

It should be noted that, instead of SAD, sum of absolute differences in a stepwise manner (hereinafter referred to as SSAD, Step SAD) and the like in view of the property of the quantization error may be used in some cases, which can also be used in this example.

Figure 10:
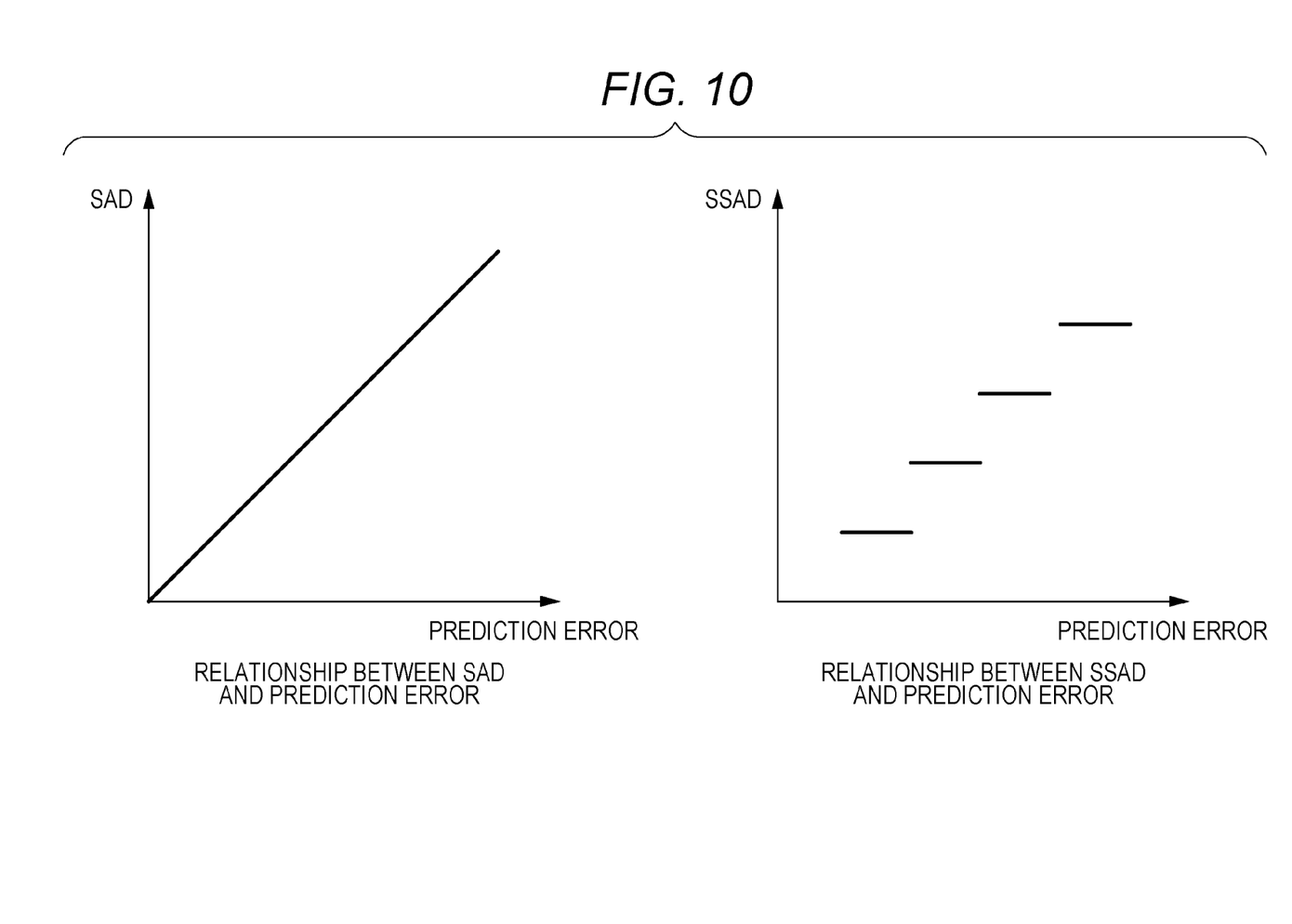
FIG. 10 is a conceptual diagram illustrating SAD and SSAD (Step SAD).

FIG. 10 is a conceptual diagram illustrating SAD and SSAD. The vertical axis denotes the values of each of SAD and SSAD. As the prediction error increases, the SAD increases in proportion to the increase of the prediction error. On the other hand, the SSAD is an evaluation value wherein the evaluation value changes in accordance with the prediction error in a stepwise manner.

First Embodiment

Figure 11:
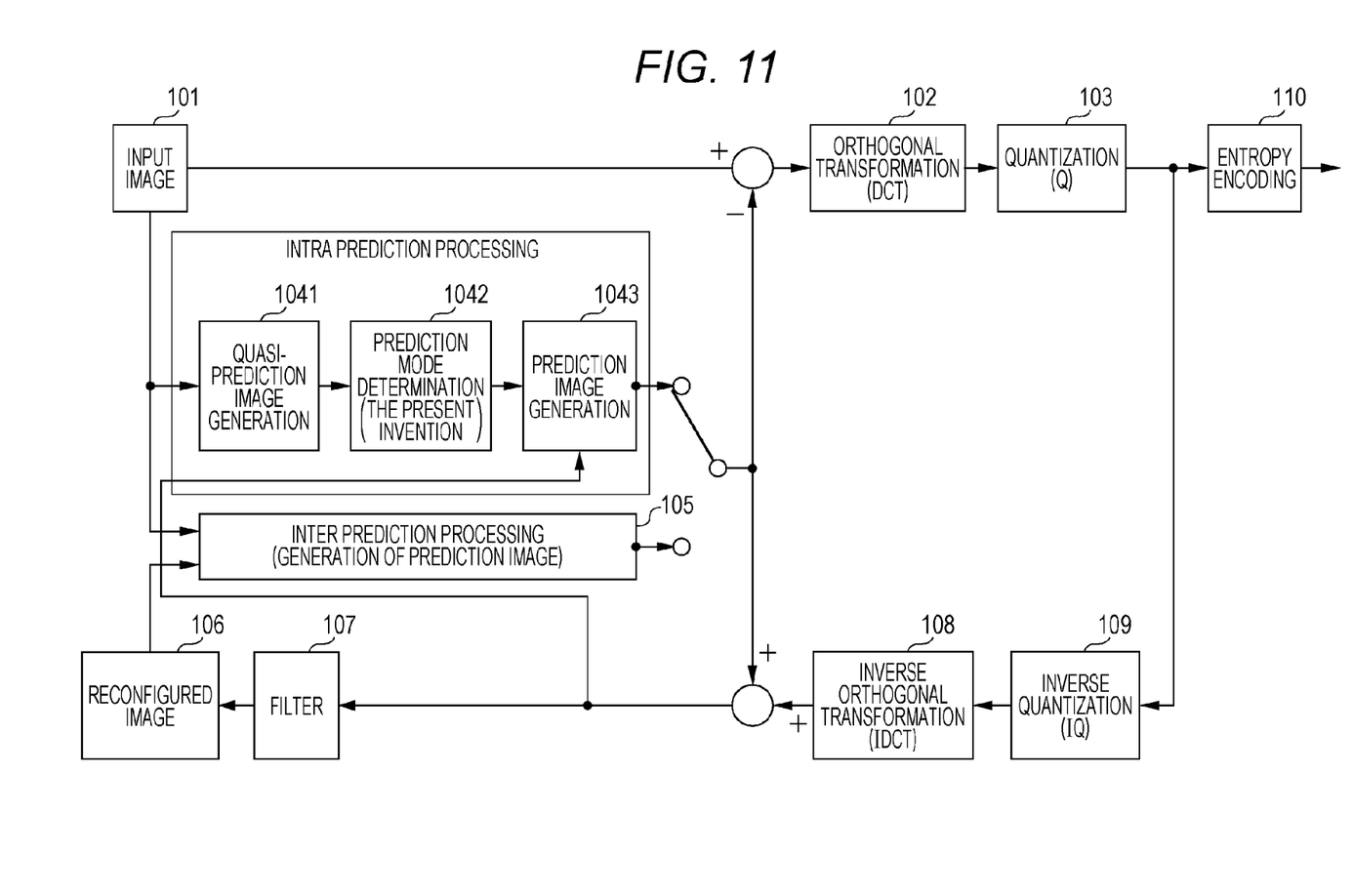
FIG. 11 is a block diagram illustrating an encoder according to a first embodiment.

FIG. 11 is a block diagram illustrating an encoder according to the first embodiment of the present invention. The encoder of FIG. 11 performs encoding in accordance with H.264 like FIG. 1, but the encoder of FIG. 11 is different in the configuration of an intra prediction processing unit 1040.

The intra prediction processing unit 1040 according to the embodiment includes a quasi-prediction image generating unit 1041 and a prediction mode determining unit 1042.

The quasi-prediction image generating unit 1041 generates quasi-prediction images for all the intra prediction modes defined by H.264. More specifically, prediction is made not on the basis of the reconfigured image but on the basis of an input image 101. However, a method based on H.264 standard is used as the calculation method of the prediction processing in each mode. Examples of methods of prediction based on the input image 101 include a method for obtaining reference pixels from the input image 101 at all times (method for simply replacing the reconfigured image with the input image) and a method for obtaining the input image 101 only for the first time and thereafter holding a quasi-prediction image according to a prediction mode selected by the prediction mode determining unit 1042 and obtaining reference pixels therefrom.

The prediction mode determining unit 1042 is a characterizing part of the present embodiment, and determines a prediction mode in accordance with an evaluation value SAD' obtained by giving weights to the reference pixels. More specifically, the prediction mode determining unit 1042 selects a prediction mode indicating the least SAD'. The calculation of SAD' is what is shown in the expression 2, but it is more effective not only to set the weight $\delta$ as a fixed value but also to change it in accordance with the quantization parameter and the size of the prediction block. In general, when the quantization parameter is larger, or when the size of the prediction block is smaller, a higher degree of effect can be obtained by setting the value of the weight $\delta$ at a larger value For example, the prediction mode determining unit 1042 may calculate the main prediction error of the selected prediction mode or obtain the main prediction error from an inverse-orthogonal transformation unit 108, may calculate a ratio of that prediction mode obtained from the similarity prediction image generating unit 1041 to the quasi-prediction error, and may hold an average value for each prediction mode and update the weight $\delta$ as necessary.

A prediction image generating unit 1043 uses the reconfigured image (1008) to generate a prediction image of the prediction mode thus determined.

The subsequent processing is the same as the general encoder processing. More specifically, a difference between the input image and the prediction image is calculated, and an orthogonal transformation unit 102 performs orthogonal transformation to obtain coefficients, and a quantization unit 103 quantizes the coefficients. The quantized coefficients are encoded and subjected to inverse-quantization by an inverse-quantization unit 109 and to inverse-orthogonal transformation by the inverse-orthogonal transformation unit 108, and are added with the prediction image used to obtain the difference with the input image, and the images thus obtained (pixel blocks) are subjected to deblock filter as necessary and are combined, whereby an image close to the input image (decoded image) is reconfigured (reconfigured image is updated).

Accordingly, the stream generated by the encoder of the present embodiment can be decoded by a general H.264 decoder. In addition, when the prediction mode is determined, a reconfigured image is not required, and therefore, the determination of the mode can be made without waiting for obtaining the reconfigured image, and the processing can be parallelized and made into pipelines.

Hereinafter, accumulation of prediction error when a quasi-prediction image is used will be considered again. In the explanation below, a prediction error made by prediction from a reconfigured image will be referred to as a main prediction error, and a prediction error made by quasi-prediction based on an input image will be referred to as a quasi-prediction error.

Figure 12:
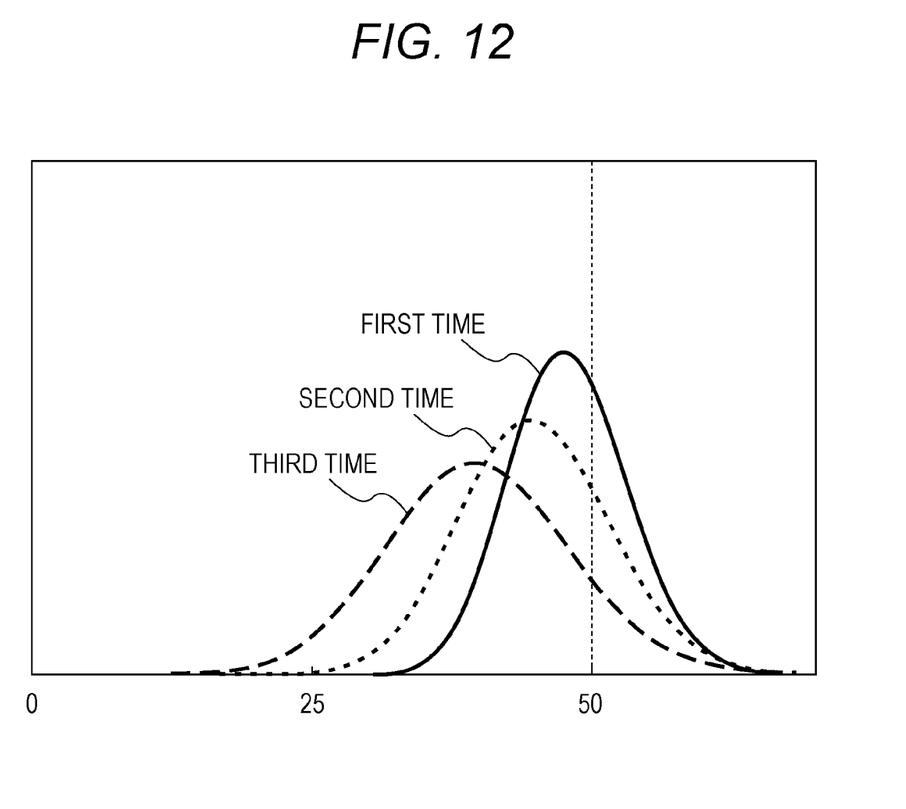
FIG. 12 is a figure schematically illustrating distribution of quasi-prediction error normalized with prediction error from a reconfigured image (main prediction error).

FIG. 12 is a figure schematically illustrating distribution of quasi-prediction error normalized with the main prediction error. The horizontal axis denotes a prediction error (SAD value), and the vertical axis denotes an occurrence probability. FIG. 12 shows the distribution of quasi-prediction error of any given pixel block when the main prediction error in the pixel block is normalized with 50 in such a manner that the distributions are shown depending on how many blocks before the pixel block the intra prediction (quasi-prediction) has been continued (the first time to the third time). In the main prediction, prediction is made from a reconfigured image in which information is lost due to quantization and the like. In contrast, in the quasi-prediction, prediction is made from the input image, and local correlation property can be used with a high degree of accuracy, and therefore, the prediction error is relatively small and accumulation of the prediction error is slow. Accordingly, the higher the number of times the quasi-prediction is made continuously, the smaller the expected value of the prediction error becomes, but the width of distribution expands.

Accordingly, the quasi-prediction error is multiplied by an appropriate coefficient according to the prediction mode, and the quasi-prediction error is changed closer to the main prediction error, whereby it is expected to reduce the chance of selecting a mode different from the main prediction. When the chance of selecting a different mode is reduced, the widths of distributions of the second and subsequent times are narrowed. In general, the error of the intra prediction tends to increase in a pixel at a lower right side in the prediction target block which is far from the reference pixel, and if this tendency is still more conspicuous in the main prediction where the reference pixels are degraded from the input image, then weights are given in such a manner that a larger weight is given to a pixel at a lower right side in the block for which the quasi-prediction error is sought, so that property close to the main prediction error may be obtained.

In a series obtained by determining a prediction mode on the basis of a main prediction error at all times (hereinafter referred to as best prediction mode selection series), a prediction mode in which the prediction error is the least in at least the prediction target block is selected on every occasion, and therefore, it is considered that almost the best selection is made. A policy of preventing the mode selection based on the quasi-prediction from deviating from the best prediction mode selection series as much as possible may be one solution.

In view of the above, the action of the encoder according to the present embodiment will be explained. When the weight $\delta$ is set as one or more, this emphasizes the error in a pixel that could be a reference pixel in a subsequent block (subsequent block reference pixel). In the prediction mode in which the SAD's has increased due to error emphasis, the prediction error of the subsequent block reference pixel is considered to increase even when prediction is made from the reconfigured image. When a mode in which the SAD' becomes the least is selected, a prediction mode in which error is likely to propagate to a subsequent block is less likely to be selected in the block.

Since the mode that is less likely to propagate error is selected in the previous block, it is expected that, in the intra prediction of the subsequent block, the prediction error decreases as compared with the mode selection according to the conventional technique. In particular, this is advantageous in a slice encoded with only intra prediction without using inter prediction.

As described above, the weight δ according to the present embodiment is considered to have two effects, i.e., an effect of making the quasi-prediction error be closer to the main prediction error and an effect of making it less likely to select a prediction mode in which error is likely to propagate to a subsequent block thus reducing accumulation of the prediction error, but what contributes to the improvement of the image quality according to the present embodiment is considered to be the latter effect. For this reason, in some cases, it may be possible to obtain still better mode selection series than the main prediction not using the weight δ. This effect is obtained by giving greater weight to pixels that may be reference pixels, and this can be used not only for the SAD but also for calculation of an evaluation value such as an activity value (reflecting the cost of the intra prediction) as described in Patent Document 4.

Moreover, the latter effect is also achieved in the mode selection of the main prediction or intra/inter prediction selection (in particular, when determination is made for each macro block). When applied to the intra/inter prediction selection, for example, SAD' is used for prediction error calculation of both of the intra prediction and the inter prediction, and both of them are compared by, for example, making correction with a predetermined magnification rate, and a prediction with a smaller one is selected. The larger the weight δ is, the less likely the intra prediction will be selected, and therefore, the weight δ as well as the above magnification rate are controlled so that a desired intra/inter prediction ratio is obtained.

INDUSTRIAL APPLICABILITY

The present invention can be applied not only to H.264 standard but also to any image encoding method that performs intra prediction in general.

What is claimed is:

1. A motion picture encoding method that encodes a pixel block upon selecting one of a plurality of intra prediction modes, the motion picture encoding method comprising:
   a step of generating a plurality of quasi-prediction images according to the plurality of intra prediction modes from an input image;
   a step of calculating a plurality of prediction errors of the plurality of prediction images generated by a quasi-prediction image generating unit by giving a weight emphasizing a prediction error in a pixel that could be a reference pixel in an intra prediction of another pixel block and determining a prediction mode on a basis of the plurality of calculated prediction errors;
   a step of generating a prediction image from a reconfigured image in accordance with the determined prediction mode;
   a step of obtaining a difference image by subtracting the prediction image generated from the reconfigured image;
   a step of obtaining a coefficient by Performing orthogonal transformation of the difference image and quantizing the coefficient; and
   a step of performing dequantization and inverse orthogonal transformation of the quantized coefficient and updating the reconfigured image on a basis of an image obtained by adding the coefficient to the prediction image generated from the reconfigured image;
   wherein in the step of calculating, the plurality of calculated prediction errors for the pixel block are calculated by a formula:

$$SAD' = \sum_i |Input(i) - Pred(i)| + \delta \sum_j |Input(j) - Pred(j)|,$$

wherein SAD' is prediction errors, Input(i) and Input(j) are pixels of the input image, Pred(i) and Pred(j) are pixels of a quasi-prediction image, i is a suffix for pixels other than a weighting target pixel, j is a suffix for the weighting target pixel, and δ denotes the weight.

* * * * *